US010431180B1

(12) United States Patent
Sampath et al.

(10) Patent No.: US 10,431,180 B1
(45) Date of Patent: Oct. 1, 2019

(54) PREDICTIVE PRE-RENDERING OF CONTENT AND UPDATING OF PRE-RENDERED CONTENT PRIOR TO DISPLAY

(71) Applicant: Amazon Technologies, Inc., Seattle, WA (US)

(72) Inventors: Sridhar Sampath, Chennai (IN); Satishkumar Kothandapani Shanmugasundaram, Chennai (IN); Venkatesh Kancharla, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 14/500,146

(22) Filed: Sep. 29, 2014

(51) Int. Cl.
*G09G 5/00* (2006.01)
*G06T 1/60* (2006.01)

(52) U.S. Cl.
CPC .............. *G09G 5/001* (2013.01); *G06T 1/60* (2013.01); *G09G 2340/14* (2013.01); *G09G 2354/00* (2013.01); *G09G 2360/12* (2013.01); *G09G 2360/18* (2013.01); *G09G 2380/14* (2013.01)

(58) Field of Classification Search
CPC . G06T 1/60; G06T 9/004; H04L 67/22; G06F 17/3053; G06F 3/0653; G06F 12/0862; G06F 2009/45583
See application file for complete search history.

(56) References Cited

U.S. PATENT DOCUMENTS

| 7,724,696 | B1 * | 5/2010 | Parekh | G06F 1/3203 370/311 |
| 9,093,050 | B1 * | 7/2015 | Orlov | G09G 5/36 |
| 2005/0001848 | A1 * | 1/2005 | Colavin | G09G 5/34 345/566 |
| 2008/0046117 | A1 * | 2/2008 | Koo | H04N 5/44543 700/236 |
| 2011/0084979 | A1 * | 4/2011 | Rutman | G09G 3/344 345/589 |
| 2012/0044276 | A1 * | 2/2012 | Yamada | G09G 3/344 345/690 |
| 2012/0260118 | A1 * | 10/2012 | Jiang | G06F 9/4843 713/340 |
| 2012/0290653 | A1 * | 11/2012 | Sharkey | H04W 4/023 709/204 |
| 2013/0120473 | A1 * | 5/2013 | Yamada | G09G 3/34 345/690 |
| 2014/0064123 | A1 * | 3/2014 | Kim | H04W 24/08 370/252 |
| 2014/0208269 | A1 * | 7/2014 | Boyana | H04M 1/66 715/835 |

* cited by examiner

*Primary Examiner* — Jeffrey J Chow
(74) *Attorney, Agent, or Firm* — Eversheds Sutherland (US) LLP (57) ABSTRACT

Systems, methods, and computer-readable media are disclosed for pre-rendering content in one or more secondary content buffers to reduce the amount of time required to display the pre-rendered content on a device. The pre-rendered content may be associated with a high probability of being accessed subsequent to content currently being displayed on the device, and may be identified based on the currently displayed content and/or historical device usage data.

18 Claims, 5 Drawing Sheets

PREDICTIVE PRE-RENDERING OF CONTENT AND UPDATING OF PRE-RENDERED CONTENT PRIOR TO DISPLAY

BACKGROUND

Electronic paper display technologies are designed to mimic the appearance of ordinary ink on paper. Electronic paper displays are generally reflective displays that may include a layer of charged particles that either reflect or absorb light to form an image. Various types of reflective displays exist including, for example, electrophoretic displays, electrowetting displays, electrofluidic displays, and so forth. An advantage of reflective displays is their ability to generate images that can be seen in direct sunlight without the images appearing to fade. A disadvantage of some current reflective displays is their low refresh rate as compared to other low-power display technologies such as, for example, liquid crystal displays (LCD).

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for pre-rendering content in one or more secondary buffers stored on a user device, updating the pre-rendered content based on detected events, and causing the pre-rendered content to be displayed on a display of the device in response to a display triggering action.

Content, as that term is used herein, may include any type of content that exists in the form of digital data and which is capable of being consumed. Example types of digital content may include, without limitation, electronic books or other electronic publications ("e-books"), Internet content, or the like. Content may include text content, graphical content, audio content, video content, or the like, and may include information that is broadcast, streamed, or contained in computer files stored on a device configured to render the content. While example embodiments of the disclosure may be described in the context of e-books and/or electronic reader ("e-reader") devices, it should be appreciated that the disclosure is more broadly applicable to any form of digital content consumable on any suitable user device including, without limitation, a smartphone, a tablet, a wearable device, a content streaming device, a digital media consumption device, a video game console, a set-top box, or any other suitable device.

In an example embodiment of the disclosure, a primary content buffer may be maintained on a user device such as an e-reader. The primary content buffer (which may also be referred to herein at times as a front buffer) may store color depth information indicating a color value for each pixel of a display of the e-reader. The color depth information may correspond to particular content to be displayed on the e-reader. The number of bits used per pixel to represent the color depth information may vary depending on whether the display is a monochrome (e.g., black-and-white) display, a grayscale display, or a color display. For example, 16 bits per pixel, 24 bits per pixel, or more may be used for a color display, 8 bits per pixel may be used for a grayscale display, and 2 bits per pixel may be used for a monochrome display. The color depth information stored in the primary content buffer may be provided to a display driver which may be configured to generate—based on the color depth information—signals having suitable voltage, current, timing, etc. in order to cause the screen to display an image of the content represented by the color depth information.

One or more secondary content buffers may also be stored on the e-reader. Content may be pre-rendered in a secondary content buffer prior to being displayed by the e-reader. Pre-rendering content in a secondary content buffer may include generating and storing a screen image of the content in the secondary content buffer. In particular, pre-rendering content in a secondary content buffer may include generating and storing corresponding color depth information in the secondary content buffer. The color depth information may include respective data for each pixel of a display of the e-reader, where the respective data represents a color value for the pixel. As previously noted, any suitable number of bits can be used to represent the color value for each pixel depending on the type of display.

Content pre-rendered in a secondary content buffer may be identified based on content currently being displayed by the e-reader and/or device usage data. The device usage data may include historical usage data for the e-reader that indicates, for example, screen transitions initiated by a user of the e-reader over some period of time (e.g., a transition from the "home" screen to a screen displaying content of a particular e-book); historical actions performed by a user in response to a device-initiated action (transitioning to "airplane mode" or charging the e-reader in response to a low battery alert); historical actions performed by a user in response to a user-initiated action (e.g., accessing an e-book subsequent to its download), and so forth. The device usage data may include data that is specific to use of a particular device—by a particular user or by multiple users—or aggregate data that relates to use of multiple devices by multiple users.

The device usage data may be analyzed with respect to content currently being displayed on the e-reader to identify candidate next content for display on the e-reader. In an example embodiment of the disclosure, a respective probability of occurrence of each of multiple candidate next actions may be determined. Content that corresponds to these candidate next actions may be identified and pre-rendered in one or more secondary content buffers.

For example, analysis of the device usage data may reveal that a user of the e-reader (or an aggregate number of users across multiple devices) is most likely to select an available Wi-Fi network after switching off the "airplane mode" for the e-reader. Accordingly, if the screen image currently being displayed on the e-reader is one that corresponds to transitioning out of airplane mode, selection of an available Wi-Fi network may be determined to be the most probable next action and content corresponding to a screen image for selecting an available Wi-Fi network may be pre-rendered in a secondary content buffer.

As another illustrative example, analysis of the device usage data may indicate that if a screen image corresponding to particular content of an e-book is currently being displayed on the e-reader, the next most probable action to be taken is selection of successive content of the e-book. Accordingly, in such a scenario, the e-book content that follows the content currently being displayed on the e-reader may be pre-rendered in a secondary content buffer for subsequent display on the e-reader in response to a corresponding display triggering action (e.g., a swipe, selection of a "next page" button, icon, or the like, etc.).

In an example embodiment of the disclosure, respective content that corresponds to multiple candidate next actions may be pre-rendered in respective secondary content buffers. The content may be prioritized in accordance with the probability of occurrence of the corresponding candidate next actions, and the assigned priorities may be used to determine whether to pre-render the content. For example, content corresponding to the 5 candidate next actions most likely to occur in light of the device usage data and the content currently being displayed on the e-reader may be pre-rendered in secondary content buffers, while content corresponding to less probable candidate next actions may not be pre-rendered. In certain example embodiments, a state of the e-reader may also be used to determine whether to pre-render candidate next content. For example, available data storage on the e-reader (e.g., available memory) may be assessed in connection with the priority assigned to particular candidate next content to determine whether to pre-render the particular candidate next content. As available data storage increases, lower priority candidate next content may be pre-rendered. Similarly, available data storage may also impact whether content that has been pre-rendered is deleted from a secondary content buffer. For example, as available data storage decreases, pre-rendered content having a relatively lower priority may be deleted from a secondary content buffer in order to compensate for the decrease in available data storage.

In certain example embodiments, one or more respective secondary content buffers may be maintained for each of one or more applications executable on the e-reader. For example, one or more secondary content buffers may be maintained for the "home screen" application, one or more secondary content buffers may be maintained for the e-book consumption application, one or more secondary content buffers may be maintained for the "settings" application, and so forth. Accordingly, in certain example embodiments, device usage data and/or content currently being displayed on the e-reader may be analyzed to determine whether candidate next content corresponding to a first application executable on the e-reader should be prioritized over candidate next content corresponding to a second application executable on the e-reader. For example, if the "settings" screen is currently being displayed on the e-reader, candidate next content corresponding to the "settings" application (e.g., a screen image for selecting an available wireless network, a screen image for switching the airplane mode on or off, etc.) may be more likely to be accessed, and thus, prioritized over content corresponding to a different application (e.g., e-book content accessed via the e-book consumption application).

Further, in certain example embodiments, candidate next content may only be identified for the current foreground application, while secondary content buffers associated with background applications may be populated with default screen images. For example, in certain example embodiments, respective candidate next content may be stored—in accordance with respective probabilities of being accessed—in one or more secondary content buffers associated with the current foreground application, while secondary content buffers associated with background applications may store default content (e.g., a secondary content buffer for the "home" screen application may store a default image of the home screen).

In certain example embodiments, the secondary content buffers may be maintained at a framework layer as opposed to an application layer. As such, an application may instruct the framework layer to pre-render candidate next content in an appropriate secondary content buffer. Further, because the framework layer is aware of the respective states of various applications on the e-reader (e.g., whether an application is a foreground or background application), maintaining the secondary content buffers at the framework layer permits the identification of candidate next content having a higher likelihood of being accessed from a current foreground application. For example, the framework layer is aware of which application is currently the foreground application, which may impact—depending on the device usage data—what content is pre-rendered in a secondary content buffer corresponding to the foreground application as well as what content is pre-rendered in secondary content buffers corresponding to other applications.

Content that has been pre-rendered in a secondary content buffer may be updated in response to detected events. An event may include, without limitation, a change in a device metric indicative of a state of the e-reader or a change in a use metric relating to use of the e-reader. The device metric may be, for example, a battery usage metric indicating an amount of battery power that has been consumed or that is available for use, a wireless connection signal strength metric indicating signal strength of a connection between the e-reader and a wireless network, a time metric that represents a current time maintained by a clock of the e-reader or received from an external source, and so forth. The wireless connection signal strength metric may be, for example, a received signal strength indicator (RSSI) that represents a measurement of the power present in a received radio signal, a received channel power indicator (RCPI), or the like. The use metric may be, for example, a content consumption metric that indicates an expected amount of time remaining for a user to consume a current chapter or section of an e-book or an expected amount of time remaining to consume the entire e-book content. As another example, the use metric may be a metric representative of other consumption statistics such as a number of dictionary accesses, a number of embedded link selections, a current location within an e-book that is being consumed, and so forth.

The change in the device metric and/or the use metric may occur as a result of user interaction with the e-reader or may result from automated device-initiated actions. For example, a strength of a wireless connection may change as a result network characteristics (e.g., network congestion) or as a result of establishment—by a user or automatically—of a connection with a different wireless network. Changes to a device metric or a use metric may trigger the generation of an event notification. Various portions of content pre-rendered in a secondary content buffer may be configured as listeners for particular types of events. Such portions of pre-rendered content may be referred to herein at times as views, widgets, components, elements, or the like. A particular view in pre-rendered content may serve as representation of a corresponding device metric or use metric. For example, a particular view in pre-rendered content may be an image that represents a current value of the wireless connection signal strength metric. As another example, another view in pre-rendered content may be an image that represents a current value of the battery usage metric. As yet another example, a view in pre-rendered content may be an image that represents a current time. As still another example, one or more views in the pre-rendered content may be image(s) that represent various content consumption metric(s).

When a particular event is detected, those view(s) listening for the event may be identified and color depth information corresponding to the view(s) may be updated to reflect the change in the device metric or use metric specified by the event. More specifically, the color values for pixels corresponding to the affected views may be updated so as to cause updated images to be generated that are reflective of the change indicated by the event. For example, an image representing the strength of a wireless connection may be updated to reflect a change in the strength of the connection indicated by a detected event.

As events are detected, corresponding views in pre-rendered content may be updated. In certain example embodiments, even though an event may be relevant to views present in content pre-rendered in more than one secondary content buffer, only a subset of the affected views may be updated. For example, as previously noted, respective content corresponding to multiple candidate next actions may be pre-rendered in respective secondary content buffers. Further, as previously noted, the respective pre-rendered content may be assigned respective priorities indicative of the respective probabilities of occurrence of corresponding candidate next actions. As such, in certain example embodiments, only those affected views present in pre-rendered content having a probability above a threshold value of being accessed next after content currently displayed on the e-reader may be updated. The threshold value may be a static value or a dynamic value that changes based on available processing capabilities, available data storage, or the like.

In certain example embodiments, an event may correspond to a change to pre-rendered content that may not relate to a change to a device metric or a use metric. For example, while the e-reader application is the foreground application (e.g., a particular e-book is being consumed), a new e-book may be downloaded. This event—the downloading of a new e-book—may cause a home screen image pre-rendered in a secondary content buffer associated with the home screen application to be updated to include the title of the e-book that was downloaded. Accordingly, when the user transitions to the home screen application, the updated pre-rendered home screen image may indicate the title of the newly downloaded e-book. It should be appreciated that the above example is merely illustrative and not exhaustive.

Content pre-rendered in a secondary content buffer may be caused to be displayed on a display on the e-reader in response to a display triggering event. For example, a user may interact with a touch-screen display of the e-reader, a physical button, or the like to initiate a transition to a screen that corresponds to content that has been pre-rendered in a secondary content buffer. In response, the color depth information stored in the secondary content buffer may be provided to a display driver of the e-reader which may, in turn, cause a screen image representative of the pre-rendered content and corresponding to the color depth information to be displayed. In certain example embodiments, a determination may be made based on input received at the e-reader as to whether a particular application has transitioned from a foreground application to a background application (or vice versa) or whether the particular application has remained as a foreground or background application. Candidate next content pre-rendered in a secondary content buffer that corresponds to a foreground application may then be displayed on the e-reader.

It should be appreciated that in certain example embodiments candidate next content pre-rendered in a secondary content buffer associated with the foreground application may not be appropriate for display on the e-reader based on the input received. For example, in an example embodiment of the disclosure, if the current screen image is the "settings" screen, switching the airplane mode on or off may be determined to be the candidate next action having the highest probability of occurring next, and as such, a corresponding screen image for selecting or de-selecting the airplane mode may be pre-rendered in a secondary content buffer associated with the current application. However, the user may, in fact, make a selection to transition from the settings screen to a different screen than the airplane mode screen such as, for example, the "device registration" screen, a particular e-book, the home screen, or the like. As a result, the pre-rendered content may not be appropriate for display, and instead, appropriate content may be rendered in the primary buffer for display by the e-reader. In certain example embodiments, if a background application transitions to be the foreground application based on user input, content pre-rendered in a secondary content buffer associated with the previous background application (newly transitioned foreground application) may be displayed even though such content was not identified as candidate next content having the highest probability of being accessed.

Example embodiments of the disclosure provide a number of technical features or technical effects. For example, in accordance with example embodiments of the disclosure, candidate next content may be identified using predictive analytics processing that determines—based on device usage data and/or content currently being displayed on a device—the probabilities of various candidate next actions that may be performed. Identified candidate next content may then be pre-rendered in a secondary content buffer and displayed when appropriate so as to decrease the time required for displaying an image of the candidate next content. This may be used to compensate for the slow display refresh rate of certain devices, for example. In addition, in accordance with certain example embodiments of the disclosure, candidate next content may be prioritized and pre-rendered based on the assigned priorities and/or based on other factors such as, for example, available device storage. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Use Case

Figure 1:
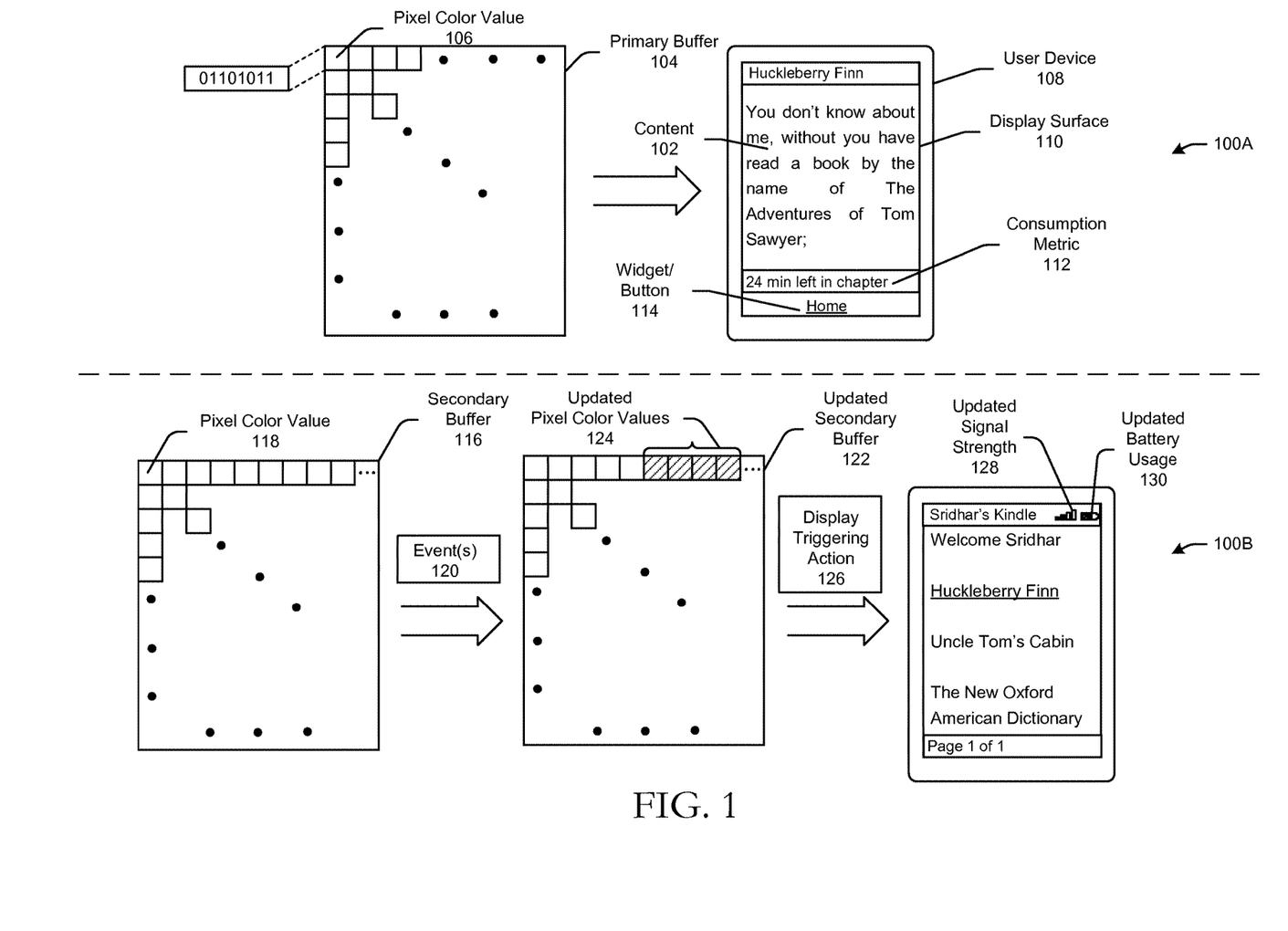
FIG. 1 is a schematic diagram of an illustrative use case involving the pre-rendering of content in a secondary content buffer and the updating of the pre-rendered content prior to display on a user device in accordance with one or more example embodiments of the disclosure.

FIG. 1 is a schematic diagram of an illustrative use case involving the pre-rendering of content in a secondary content buffer and the updating of the pre-rendered content prior to display on a user device in accordance with one or more example embodiments of the disclosure.

A first event flow 100A is depicted above the dashed line. As part of event flow 100A, certain content 102 may be displayed on a display surface 110 of a user device 108, such as an e-reader. The content 102 may be rendered in a primary buffer 104. More specifically, color depth information may be stored in the primary buffer 104. The color depth information may specify a color value 106 for each pixel of the display surface 110. While 8 bits are illustratively depicted in FIG. 1 for representing the color value 106 of each pixel, it should be appreciated that any number of bits may be used depending on the type of display (e.g., 2 bits may be used for a monochrome display, 16 bits may be used for a color display, etc.).

The color depth information stored in the primary content buffer 104 may be provided to a display driver (not shown in FIG. 1) which may be configured to generate—based on the color depth information—signals having suitable voltage, current, timing, etc. in order to cause the display surface 110 to display an image of the content 102 represented by the color depth information. The illustrative content 102 depicted in FIG. 1 includes the text of a particular portion of an e-book. The displayed content 102 may further include a view 112 that provides an indication of a consumption metric, such as, the amount of expected reading time remaining for a current chapter. It should be appreciated that the view 112 is merely illustrative and that any of a variety of types of views representative of various metrics may be displayed. In addition, the content 102 may further include a selectable widget 114 that may cause the user device 108 to transition to a home screen responsive to selection. In certain example embodiments, a physical button 114 may be provided for transitioning to the home screen.

A second event flow 100B is depicted below the dashed line. At an initial stage of event flow 100B, candidate next content may be pre-rendered in a secondary content buffer 116. As previously described, the candidate next content may be identified based, for example, on device usage data and/or the current content 102 being displayed. In certain example embodiments, the secondary content buffer 116 may be associated with a different application than the current foreground application. For example, as depicted in FIG. 1, the current foreground application may be an e-reader application, and the current content 102 may be a particular portion of an e-book. The secondary content buffer 116 may be associated with a different application (e.g., a home screen application). As such, default content (e.g., a home screen image) may be pre-rendered in the secondary content buffer 116. Pre-rendering candidate next content in the secondary content buffer 116 may include storing color depth information in the secondary content buffer 116 that includes a color value 118 for each pixel of the display such that the color values for all pixels in the aggregate correspond to an image of the candidate next content.

At a subsequent stage in the event flow 100B, the content that has been pre-rendered in the secondary content buffer 116 may be updated in response to one or more detected events 120. As described earlier, an event 120 may include, without limitation, a change in a device metric indicative of a state of the device 108 or a change in a use metric relating to use of the device 108. The device metric may be, for example, a battery usage metric, a wireless connection signal strength metric, a time metric, and so forth. The use metric may be, for example, a content consumption metric that indicates an amount of expected time remaining to consume a current chapter or section of an e-book, an amount of expected time remaining to consume the entire e-book content, a number of dictionary accesses, a number of embedded link selections, a current location of an e-book that is being consumed, and so forth.

Various portions of the content pre-rendered in the secondary content buffer 116 may be configured to listen for particular types of events. When a particular event 120 is detected, those view(s) listening for the event may be identified and color depth information corresponding to the view(s) may be updated to generate updated color depth information that reflects the change in the device metric or use metric specified by the event 120. More specifically, the color values for pixels corresponding to the affected views may be updated so as to cause updated images to be generated that are reflective of the change indicated by the event 120. The buffer containing the now updated color depth information is referred to as an updated secondary content buffer 122 in FIG. 1.

For example, as shown in FIG. 1, if an event 120 indicates a change in the signal strength of a wireless connection and/or a change in the amount of battery power available for use, corresponding pixel color values 124 may be updated such that corresponding views, when displayed, convey the change specified by the event 120. It should be appreciated that content pre-rendered in other secondary content buffers may be updated as well in response to detected events 120. If, for example, an event 120 indicates a change to a content consumption metric (e.g., an expected amount of remaining consumption time), corresponding pixel color values of content pre-rendered in a secondary content buffer associated with the e-reader application may be updated such that a corresponding view (e.g., view 112), when displayed, conveys the change in the content consumption metric specified by the event 120.

The content pre-rendered in the updated secondary content buffer 122 may be caused to be displayed on the display 110 of the device 108 in response to a display triggering action 126 such as, for example, a user-initiated or a device-initiated action. For example, a user may interact with a touch-screen display 110 of the device 108, a physical button, or the like to initiate a transition to a screen that corresponds to content that has been pre-rendered in the secondary content buffer 116. In response, the updated color depth information stored in the updated secondary content buffer 122 may be provided to a display driver of the device 108 which may, in turn, cause a screen image representative of the pre-rendered content and corresponding to the updated color depth information to be displayed. As shown in FIG. 1, when the content pre-rendered in the updated secondary content buffer 122 is displayed, various views may reflect changes indicated by any events 120 that were received and processed prior to display. For example, a view 128 may indicate an updated signal strength and a view 130 may indicate an updated battery usage reflective of events 120 received while the content 102 was displayed.

Illustrative Device Architecture

Figure 2:
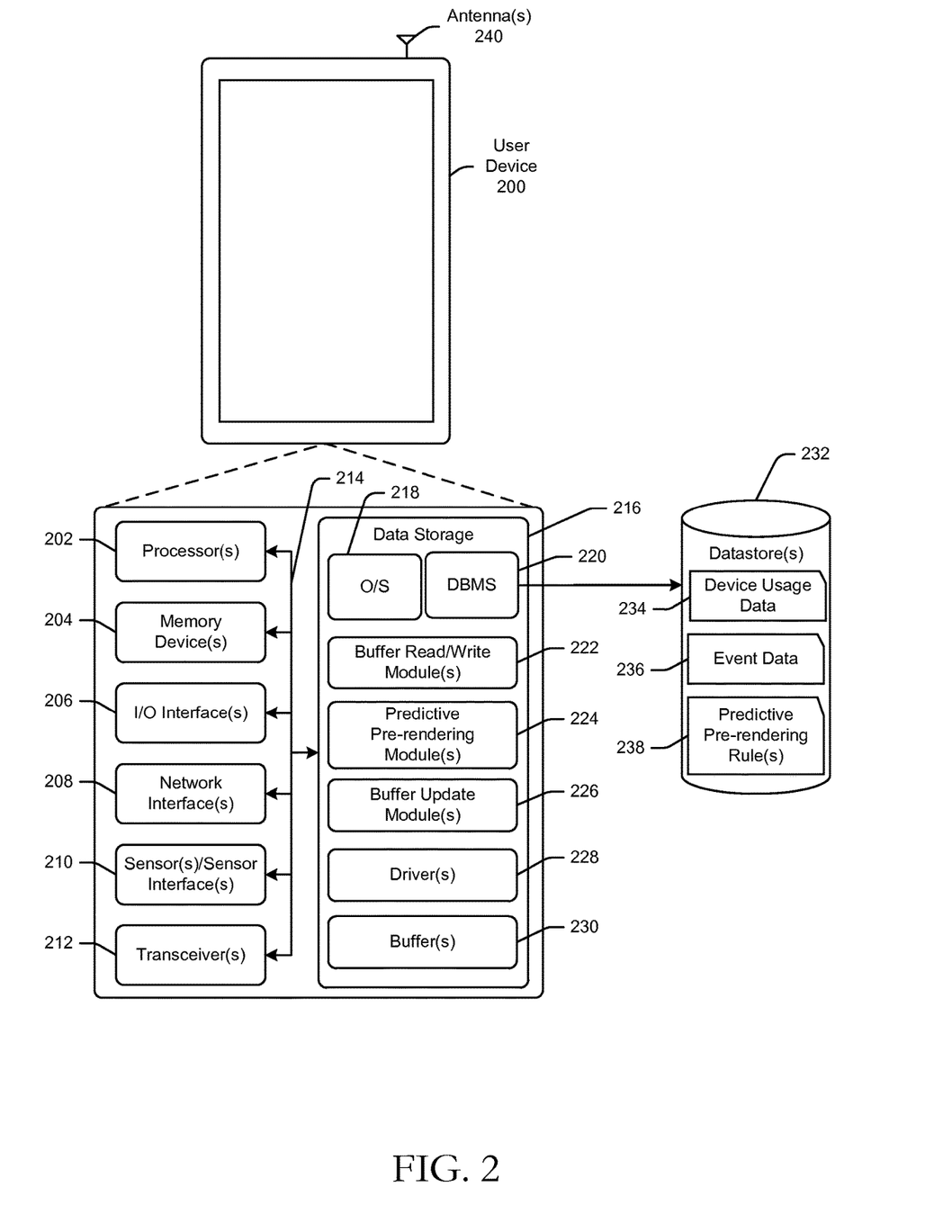
FIG. 2 is a schematic block diagram of an illustrative user device in accordance with one or more example embodiments of the disclosure.

FIG. 2 is a schematic block diagram of an illustrative user device 200 in accordance with one or more example embodiments of the disclosure. The user device 200 may include any suitable computing device including, but not limited to, a mobile device such as a smartphone, tablet, e-reader, wearable device, or the like; a desktop computer; a laptop computer; a content streaming device; a set-top box; or the like. The user device 200 may correspond to an illustrative device configuration for the user device 108.

The device 200 may be configured to communicate via one or more networks (not shown) with one or more servers, user devices, or the like. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the device 200 may include one or more processors (processor(s)) 202, one or more memory devices 204 (generically referred to herein as memory 204), one or more input/output ("I/O") interface(s) 206, one or more network interfaces 208, one or more sensors or sensor interfaces 210, one or more transceivers 212, and data storage 216. The device 200 may further include one or more buses 214 that functionally couple various components of the device 200. The device 200 may further include one or more antennas 240 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 214 may include at least one of a system bus, a memory bus, an address bus, or a message bus, and may permit exchange of information (e.g., data (including computer-executable code), signaling, etc.) between various components of the device 200. The bus(es) 214 may include, without limitation, a memory bus or a memory controller, a peripheral bus, an accelerated graphics port, and so forth. The bus(es) 214 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 204 of the device 200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 204 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 204 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 216 may include removable storage and/or non-removable storage including, but not limited to, magnetic storage, optical disk storage, and/or tape storage. The data storage 216 may provide non-volatile storage of computer-executable instructions and other data. The memory 204 and the data storage 216, removable and/or non-removable, are examples of computer-readable storage media (CRSM) as that term is used herein.

The data storage 216 may store computer-executable code, instructions, or the like that may be loadable into the memory 204 and executable by the processor(s) 202 to cause the processor(s) 202 to perform or initiate various operations. The data storage 216 may additionally store data that may be copied to memory 204 for use by the processor(s) 202 during the execution of the computer-executable instructions. Moreover, output data generated as a result of execution of the computer-executable instructions by the processor(s) 202 may be stored initially in memory 204, and may ultimately be copied to data storage 216 for non-volatile storage.

More specifically, the data storage 216 may store one or more operating systems (O/S) 218; one or more database management systems (DBMS) 220; and one or more program modules, applications, or the like such as, for example, one or more buffer read/write modules 222, one or more predictive pre-rendering modules 224, one or more buffer update modules 226, and one or more device drivers 228 such as, for example, a display driver. Any of the program modules may include one or more sub-modules. In addition, the data storage 216 may store various other types of data such as, for example, one or more buffers 230 including a primary content buffer and one or more secondary content buffers. Any of the modules depicted in FIG. 2 may include computer-executable code, instructions, or the like that may be loaded into the memory 204 for execution by one or more of the processor(s) 202. Further, any data stored in the data storage 216 (e.g., color depth information stored in a buffer 230) may be loaded into the memory 204 for use by the processor(s) 202 in executing computer-executable code. In addition, any data potentially stored in one or more datastores 232 (e.g., device usage data 234, event data 236, or predictive buffering rule(s) 238) may be accessed via the DBMS 220 and loaded in the memory 204 for use by the processor(s) 202 in executing computer-executable code.

The processor(s) 202 may be configured to access the memory 204 and execute computer-executable instructions loaded therein. For example, the processor(s) 202 may be configured to execute computer-executable instructions of the various program modules of the user device 204 to cause or facilitate various operations to be performed in accordance with one or more embodiments of the disclosure. The processor(s) 202 may include any suitable processing unit capable of accepting data as input, processing the input data in accordance with stored computer-executable instructions, and generating output data. The processor(s) 202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 202 may be capable of supporting any of a variety of instruction sets.

Referring now to functionality supported by the various program modules depicted in FIG. 2, the buffer read/write module(s) 222 may include computer-executable instructions, code, or the like that responsive to execution by one or more of the processor(s) 202 may cause color depth information to be written to a buffer or read from a buffer by a display driver 228 for display by the device 200. In certain example embodiments, a software display driver 228 may read the color depth information from the buffer and communicate the information to a hardware display driver configured to generate voltages, currents, or the like for controlling pixel elements of a display of the device 200 to generate an image corresponding to the color depth information.

The predictive pre-rendering module(s) 224 may include computer-executable instructions, code, or the like that responsive to execution by one or more of the processor(s) 202 may cause candidate next content to be identified. For example, the predictive pre-rendering module(s) 224 may execute predictive analytics processing using the device usage data 234 and/or content currently being displayed on the device 200 as inputs to determine respective probabilities of candidate next actions that may be performed on the device 200. Candidate next content corresponding to the candidate next actions may be identified and pre-rendered in one or more secondary content buffers 230. The predictive pre-rendering module(s) 224 may further include computer-executable instructions, code, or the like that responsive to execution by one or more of the processor(s) 202 cause respective priorities to be assigned to different candidate next content based, for example, on the respective probabilities of the candidate content being accessed next. The predictive pre-rendering module(s) 224 may then instruct the buffer read/write module(s) 222 to pre-render candidate next content based on an assigned priority and/or based on other factors such as, for example, an amount of available data storage. For example, in certain example embodiments, only candidate next content having an assigned priority above a threshold value (which may correspond to a probability of being accessed above a threshold value) may be initially pre-rendered. As more data storage becomes available, candidate next content assigned a lower priority may be pre-rendered in one or more additional secondary content buffers 230. In certain example embodiments, the predictive pre-rendering module(s) 224 may pre-render default content in a secondary content buffer. For example, one or more respective secondary content buffers may be associated with each of one or more applications executable on the device 200. As such, in certain example embodiments, default content may be pre-rendered in a secondary content buffer associated with a background application. For example, if the e-reader application is the foreground application, then a default home screen image may be pre-rendered in a secondary content buffer associated with the home screen application.

In addition, in certain example embodiments, the results of a predictive analysis of i) device usage data 234 and/or ii) content currently being displayed on the device 200 may be stored as one or more predictive pre-rendering rules 238. The rules 238 may indicate candidate next content associated with particular content as well as respective probabilities of the candidate next content being accessed subsequent to display of the particular content. For example, if a "home screen" of an e-reader is being displayed after completion of an e-book download, a predictive pre-rendering rule 238 may specify that the candidate next content having the highest probability of being displayed next is the first screen image of the text of the recently downloaded e-book. The predictive pre-rendering rule 238 may further specify additional candidate next content that may be accessed subsequent to display of the home screen in the situation described above. Such additional candidate next content may be associated with a lesser probability of being accessed. In certain example embodiments, the predictive pre-rendering module(s) 224 may leverage the predictive pre-rendering rules 238 to identify candidate next content to be pre-rendered without having to repeat predictive analytics processing that was previously performed. Further, the predictive pre-rendering rules 238 may be periodically refined or updated based on an analysis of newly generated device usage data 234.

The buffer update module(s) 226 may include computer-executable instructions, code, or the like that responsive to execution by one or more of the processor(s) 202 may cause processing to be performed to update pre-rendered content based on detected events. More specifically, the buffer update module(s) 226 may receive event data 236 as input and may identify one or more views that correspond to an event specified in the event data 236. The buffer update module(s) 226 may update those portion(s) of the color depth information stored in a secondary content buffer 230 that correspond to the identified view(s) such that when the updated pre-rendered content is displayed, the view(s) will reflect whatever change to a device metric or a use metric is indicated by the event.

Referring now to other illustrative components depicted as being stored in the data storage 216, the O/S 218 may be loaded from the data storage 216 into the memory 204 and may provide an interface between other application software executing on the device 200 and hardware resources of the device 200. More specifically, the O/S 218 may include a set of computer-executable instructions for managing hardware resources of the device 200 and for providing common services to other application programs (e.g., managing memory allocation among various application programs). In certain example embodiments, the O/S 218 may control execution of the other program modules to pre-render content in secondary content buffers 230 and/or update pre-rendered content. The O/S 218 may include any operating system now known or which may be developed in the future including, but not limited to, any server operating system, any mainframe operating system, or any other proprietary or non-proprietary operating system.

The DBMS 220 may be loaded into the memory 204 and may support functionality for accessing, retrieving, storing, and/or manipulating data stored in the memory 204 and/or data stored in the data storage 216. The DBMS 220 may use any of a variety of database models (e.g., relational model, object model, etc.) and may support any of a variety of query languages. The DBMS 220 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the device 200 is a mobile device, the DBMS 220 may be any suitable light-weight DBMS optimized for performance on a mobile device.

Referring now to other illustrative components of the device 200, one or more input/output (I/O) interfaces 206 may be provided that may facilitate the receipt of input information by the device 200 from one or more I/O devices as well as the output of information from the device 200 to the one or more I/O devices. The I/O devices may include, for example, one or more user interface devices that facilitate interaction between a user and the device 200 including, but not limited to, a display, a keypad, a pointing device, a control panel, a touch screen display, a gesture capture or detection device, a remote control device, a microphone, a speaker, and so forth. The I/O devices may further include, for example, any number of peripheral devices such as data storage devices, printing devices, and so forth.

The device 200 may further include one or more network interfaces 208 via which the device 200 may communicate with any of a variety of other systems, platforms, networks, devices, and so forth. Such communication may occur via any of the types of networks previously described.

The antenna(s) 240 may include any suitable type of antenna depending, for example, on the communications protocols used to transmit or receive signals via the antenna(s) 240. Non-limiting examples of suitable antennas may include directional antennas, non-directional antennas, dipole antennas, folded dipole antennas, patch antennas, multiple-input multiple-output (MIMO) antennas, or the like. The antenna(s) 240 may be communicatively coupled to one or more transceivers 212 or radio components to which or from which signals may be transmitted or received.

As previously described, the antenna(s) 240 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 240 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 240 may be configured to transmit or receive radio frequency signals within any suitable frequency range forming part of the unlicensed portion of the radio spectrum.

The antenna(s) 240 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 212 may include any suitable radio component(s) for—in cooperation with the antenna(s) 240—transmitting or receiving radio frequency (RF) signals in the bandwidth and/or channels corresponding to the communications protocols utilized by the device 200 to communicate with other devices. The transceiver(s) 212 may include hardware, software, and/or firmware for modulating, transmitting, or receiving—potentially in cooperation with any of antenna(s) 240—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 212 may further include hardware, firmware, or software for receiving GNSS signals. The transceiver(s) 212 may include any known receiver and baseband suitable for communicating via the communications protocols utilized by the device 200. The transceiver(s) 212 may further include a low noise amplifier (LNA), additional signal amplifiers, an analog-to-digital (A/D) converter, one or more buffers, a digital baseband, or the like.

The sensor(s)/sensor interface(s) 210 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 2 as being stored in the data storage 216 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 200, and/or hosted on other computing device(s) accessible via one or more networks, may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the device 200 may include alternate and/or additional hardware, software, or firmware components beyond those described or depicted without departing from the scope of the disclosure. More particularly, it should be appreciated that software, firmware, or hardware components depicted as forming part of the device 200 are merely illustrative and that some components may not be present or additional components may be provided in various embodiments. While various illustrative program modules have been depicted and described as software modules stored in data storage 216, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 3:
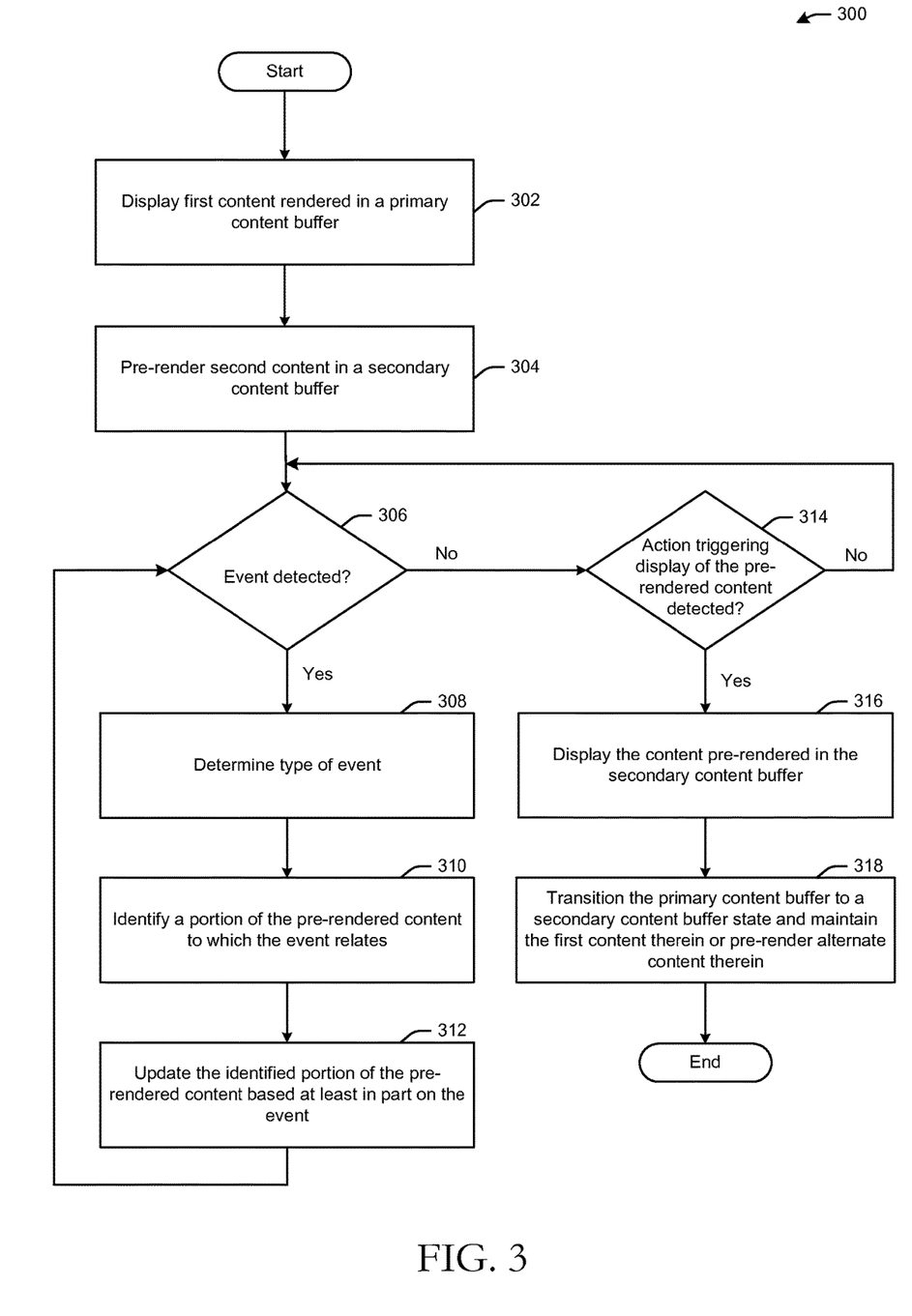
FIG. 3 is a process flow diagram of an illustrative method for pre-rendering content in a secondary content buffer, updating the pre-rendered content based on a detected event, and displaying the pre-rendered content in response to a display triggering action in accordance with one or more example embodiments of the disclosure.

FIG. 3 is a process flow diagram of an illustrative method 300 for pre-rendering content in a secondary content buffer, updating the pre-rendered content based on a detected event, and displaying the pre-rendered content in response to a user/device-initiated action in accordance with one or more example embodiments of the disclosure.

At block 302, computer-executable instructions of the buffer read/write module(s) 222 may be executed to display first content that has been rendered in a primary content buffer. More specifically, color depth information stored in the primary content buffer and representative of the first content may be provided to a display driver configured to generate signals for controlling pixel elements of a display of a device to cause the pixel elements to display the first content.

At block 304, computer-executable instructions of the buffer read/write module(s) 222 may be executed to pre-render second content in a secondary content buffer. The second content that is pre-rendered in the secondary content buffer may include content that has been identified by the predictive pre-rendering module(s) 224 as candidate next content having the highest probability of being accessed based on an analysis of device usage data 234 and/or the first content that is currently being displayed on the device 200. Further, as previously described, the predictive pre-rendering module(s) 224 may leverage stored predictive pre-rendering rule(s) 238 to identify the candidate next content pre-rendered at block 304. In certain example embodiments, the secondary content buffer may be associated with a current foreground application, while in other example embodiments, the secondary content buffer may be associated with a background application.

At block 306, a determination may be made as to whether an event relating to the pre-rendered content has been detected. More specifically, computer-executable instructions of the buffer update module(s) 226 may be executed to determine whether an event has occurred that is indicative of a change to a device metric or use metric represented by a view contained in the pre-rendered content.

In response to a positive determination at block 306, the method 300 may proceed to block 308 where computer-executable instructions of the buffer update module(s) 226 may be executed to determine a type of the event. For example, a particular device metric or use metric that has changed may be identified. In certain example embodiments, event data 236 associated with the event detected at block 306 may include data that indicates the device metric or use metric that has changed. At block 310, computer-executable instructions of the buffer update module(s) 226 may be executed to identify a portion of the pre-rendered content that is affected by the event. In particular, one or more views contained in the pre-rendered content and representative of a device metric or use metric indicated by the event as having changed may be identified. In certain example embodiments, the O/S 218 may communicate event data 236 associated with a detected event to one or more applications executable on the device, and each application may, in turn, identify those views contained in content pre-rendered in one or more secondary content buffers associated with the application that are listening for the event.

At block 312, computer-executable instructions of the buffer update module(s) 226 may be executed to update, based at least in part on the event data 236 associated with the detected event, those view(s) identified at block 310. More specifically, color depth information for the view(s) may be modified such that when the view(s) are displayed, the change indicated by the event will be reflected. From block 312, the method 300 may again proceed to block 306.

If no event has been detected at block 306, the method 300 may proceed to block 314. At block 314, a determination may be made as to whether an action triggering display of the pre-rendered content has been detected. The display triggering action may include, for example, a user-initiated action such as a user selection made via a touch-screen display or a user selection of a physical button to initiate a transition to another screen image. In response to a positive determination at block 314, the content pre-rendered in the secondary content buffer may be displayed at block 316. More specifically, the color depth information stored in the secondary content buffer may be provided to a display driver which may, in turn, cause a screen image representative of the pre-rendered content and corresponding to the color depth information to be displayed.

As a result of display of the pre-rendered content, the secondary content buffer may transition to become the primary content buffer, and the previous primary content buffer may transition to become a secondary content buffer at block 318. Further, the first content may be retained in the now secondary (previously primary) content buffer or alternate content having a higher likelihood of being accessed subsequent to the second content now being displayed may instead be rendered in the now secondary content buffer. For example, if the primary content corresponds to an image of a home screen, the primary content may be maintained in the now secondary content buffer because the primary content is likely to be accessed again in the future such as, for example, if the user navigates back to the home screen. On the other hand, if other content is more likely to be accessed than the primary content subsequent to the second content, the primary content may be replaced with such other content in the now secondary content buffer. For example, if the primary content corresponds to a "device registration" screen, it may be replaced with a default "settings screen" in the now secondary content buffer.

Figure 4:
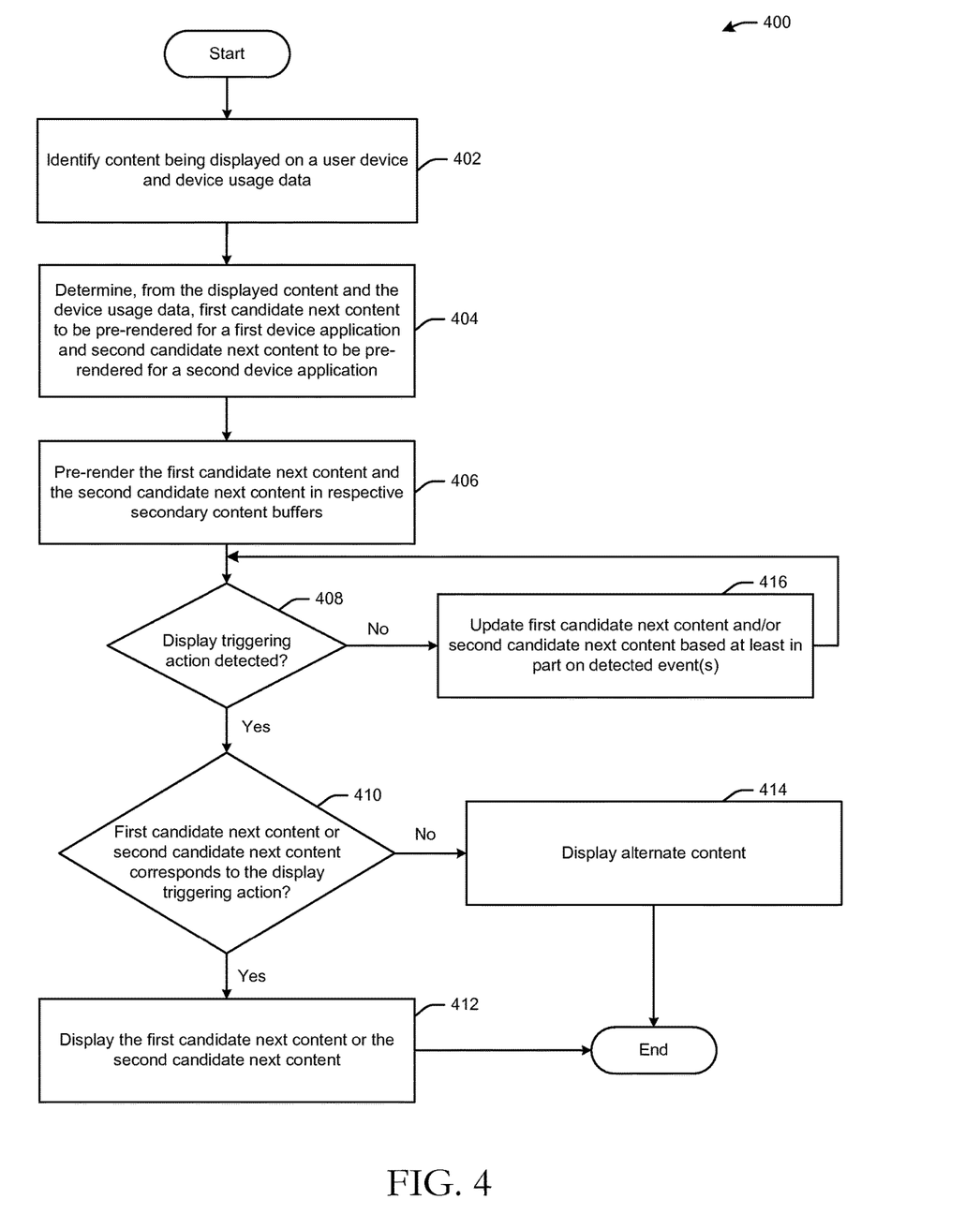
FIG. 4 is a process flow diagram of an illustrative method for determining respective candidate next content for each of multiple device applications, pre-rendering the candidate next content in respective secondary content buffers, and selecting particular pre-rendered candidate next content for display on a user device based on a correspondence with a display triggering action in accordance with one or more example embodiments of the disclosure.

FIG. 4 is a process flow diagram of an illustrative method 400 for determining respective candidate next content for each of multiple device applications, pre-rendering the candidate next content in respective secondary content buffers, and selecting particular pre-rendered candidate next content for display on a user device based on a correspondence with a display triggering action in accordance with one or more example embodiments of the disclosure.

At block 402, device usage data 234 and content currently being displayed on a user device 200 may be identified. As previously described, the device usage data 234 may include usage data only for the particular device 200 or aggregate usage data for multiple devices.

At block 404, computer-executable instructions of the predictive pre-rendering module(s) 224 may be executed to determine, based at least in part on the content currently being displayed and/or the device usage data, first candidate next content to be displayed for a first device application and second candidate next content to be displayed for a second device application. The first device application may be, for example, a foreground application with which the content currently being displayed is associated. For example, the first device application may be the reader application of an e-reader and the second device application may be the home screen application. In the above example, the first candidate next content may be content corresponding to the next screen image of an e-book and the second candidate next content may be the home screen for the home screen application.

At block 406, computer-executable instructions of the buffer read/write module(s) 222 may be executed to pre-render the first candidate next content and the second candidate next content in respective secondary content buffers. Continuing with the example introduced above, the next screen image of the e-book content may be pre-rendered in a first secondary content buffer associated with the current foreground application (e.g., the e-reader application) and the home screen image may be pre-rendered in a second secondary content buffer associated with the home screen application. In certain example embodiments, multiple secondary content buffers may be maintained for the current foreground device application. For example, for the e-reader application, three secondary content buffers may be maintained, two buffers for the two subsequent screen images of the e-book content and one buffer for the previous screen image of the e-book content.

At block 408, a determination may be made as to whether a display triggering action has been detected. If a display triggering action has not been detected, the first candidate next content and/or the second candidate next content may be updated, at block 416, based on any detected event(s), as described with reference to the illustrative method 300 of FIG. 3. The method 400 may then proceed again to block 408 to determine whether a display triggering action has been detected.

On the other hand, in response to a positive determination at block 408, the method 400 may proceed to block 410 where a determination may be made as to whether the first candidate next content or the second candidate next content corresponds to the display triggering action detected at block 408. In response to a positive determination at block 410, the first candidate next content or the second candidate next content may be displayed at block 412. Continuing with the example introduced above, if the user has selected the "next page" button or performed a swipe or other touch gesture, the first candidate next content (e.g., the next screen image of the e-book content) may be displayed. On the other hand, if the user has instead selected the "home" button, the second candidate next content (e.g., the home screen image) may be displayed. On the other hand, in response to a negative determination at block 410, the method 400 may proceed to block 414 where alternate content may be displayed on the device. Because the alternate content displayed at block 414 has not been pre-rendered, rendering an image of the alternate content on the display make take a longer amount of time than if the content had been pre-rendered.

Figure 5:
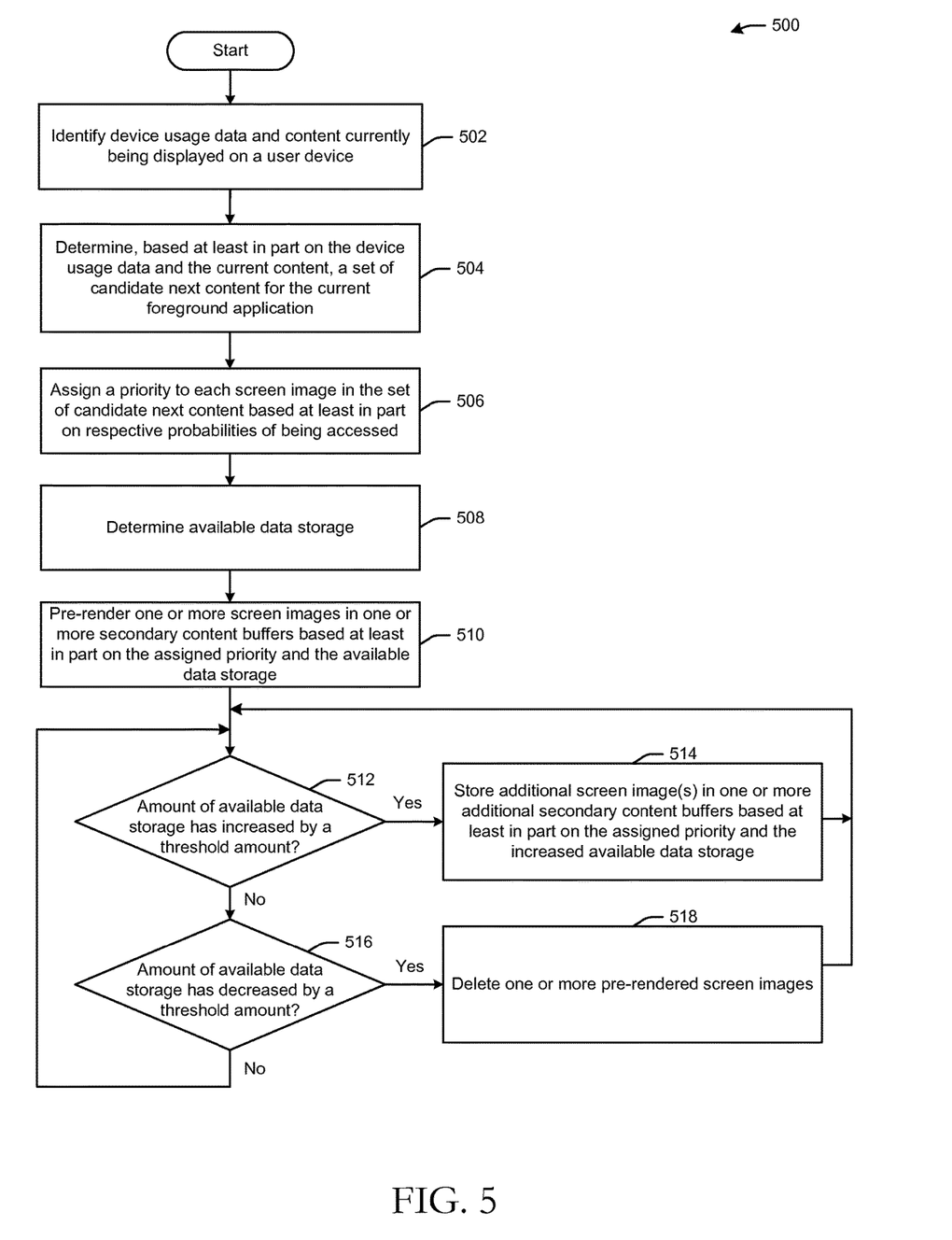
FIG. 5 is a process flow diagram of an illustrative method for determining a set of candidate next content for a current foreground application, prioritizing screen images in the set of candidate next content, and pre-rendering one or more screen images in one or more secondary content buffers based at least in part on the prioritizing and available data storage in accordance with one or more example embodiments of the disclosure.

FIG. 5 is a process flow diagram of an illustrative method 500 for determining a set of candidate next content for a current foreground application, prioritizing screen images in the set of candidate next content, and pre-rendering one or more screen images in one or more secondary content buffers based at least in part on the prioritizing and available data storage on a user device in accordance with one or more example embodiments of the disclosure.

At block 502, device usage data 234 and content currently being displayed on a user device 200 may be identified. As previously described, the device usage data 234 may include usage data only for the particular device 200 or aggregate usage data for multiple devices.

At block 504, computer-executable instructions of the predictive pre-rendering module(s) 224 may be executed to determine, based at least in part on the content currently being displayed and/or the device usage data, a set of candidate next content for the current foreground application. The set of candidate next content may include, for example, a set of screen images where each screen image includes subsequent content that may be accessed via the current foreground application.

At block 506, computer-executable instructions of the predictive pre-rendering module(s) 224 may be executed to assign a respective priority to each screen image in the set of candidate next content. The assigned priority may be correlated to the probability that the content included in a screen image is successively accessed after the content currently being displayed. For example, the screen image having the highest probability of being accessed next may be assigned the highest priority. Priorities for other screen images may be similarly assigned.

At block 508, an amount of available data storage may be determined. The data storage may include volatile or non-volatile storage. At block 510, one or more screen images in the set of candidate next content may be pre-rendered in one or more secondary content buffers associated with the current foreground application. The screen images that are pre-rendered may be identified based on the assigned priorities and/or the available data storage. For example, the screen images having the N highest priorities may be pre-rendered.

At block 512, a determination may be made as to whether an amount of available data storage has increased by some threshold amount. In response to a positive determination at block 512, additional screen image(s) may be identified based on corresponding assigned priorities and pre-rendered in additional secondary content buffers that may be generated based on the increased amount of available data storage.

On the other hand, if the amount of available data storage has not increased, a determination may be made at block 516 as to whether the amount of available data storage has decreased by a threshold amount. In response to a positive determination at block 516, the method 500 may proceed to block 518 where one or more pre-rendered screen images may be deleted from corresponding secondary content buffer(s). The operation at block 518 may serve to make additional data storage available for use by currently executing applications and/or by additional applications that may be launched. The determinations at blocks 512 and 514 and the corresponding operations performed at blocks 514 and 518 in response to positive determinations at blocks 512 and 514 may be performed iteratively.

One or more operations of the methods 300, 400, or 500 may have been described above as being performed by a device 200, or more specifically, by one or more program modules, applications, or the like executing on such the device 200. It should be appreciated, however, that any of the operations of methods 300, 400, or 500 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods 300, 400, or 500 may be described in the context of the illustrative device 200, it should be appreciated that such operations may be implemented in connection with numerous other device configurations.

The operations described and depicted in the illustrative methods of FIGS. 3-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   identifying first content displayed on a device, wherein the first content is a first portion of electronic book content accessed via a reader application, wherein the first content is displayed using first color depth information retrieved from a first content buffer;
   determining, by at least one computer processor and based at least in part on the first content and historical device usage data, second content having a highest probability of being accessed via the reader application;
   storing second color depth information corresponding to the second content in a second content buffer associated with the reader application;
   detecting, by the at least one computer processor, an event corresponding to a change to a strength of a wireless connection between the device and a wireless network;
   determining, by the at least one computer processor and based at least in part on the event, pixel values associated with a second portion of the second content;
   determining, by the at least one computer processor and based at least in part on the pixel values associated with the second portion, an updated second portion of the second content comprising an indicator of the strength of the wireless connection, the updated portion including the second color depth information and a second indicator representative of an increase in the strength of the wireless connection or a third indicator representative of a decrease in the strength of the wireless connection;
   receiving, by the at least one computer processor, input data indicating a user selection corresponding to a request to view the second content; and
   causing, by the at least one computer processor, the second content to be displayed on the device.

2. The method of claim 1, further comprising:
   determining, by the at least one computer processor, from the first content and the historical device usage data, third content having a highest probability of being accessed after the first content, wherein the third content is home screen content accessed via a home screen application of the device; and storing third color depth information corresponding to the third content in a third content buffer associated with the home screen application.

3. The method of claim 1, further comprising:

determining, by the at least one computer processor, from the second content and the historical device usage data, third content and fourth content having a respective first probability and second probability of being accessed after the second content, wherein the first probability is greater than the second probability;

storing third color depth information corresponding to the third content in a third content buffer;

determining, by the at least one computer processor, that an amount of available data storage on the device exceeds a threshold value; and storing fourth color depth information corresponding to the fourth content in a fourth content buffer.

4. The method of claim 1, wherein the event is a first event, the method further comprising:

determining, by the at least one computer processor, from the second content and the historical device usage data, third content and fourth content having respective first probability and second probability of being accessed after the second content;

storing third color depth information corresponding to the third content in a third content buffer and fourth color depth information corresponding to the fourth content in a fourth content buffer;

detecting, by the at least one computer processor, a second event corresponding to at least a portion of the third content and at least a portion of the fourth content;

determining, by the at least one computer processor, that the first probability is greater than the second probability; and updating, by the at least one computer processor, the at least a portion of the third content by adjusting a corresponding portion of the third color depth information.

5. A method, comprising:

identifying, by at least one computer processor, first content displayed on a display of a device, wherein the first content is a first portion of electronic book content accessed via a reader application of the device;

determining, by the at least one computer processor, and based at least in part on the first content and device usage data, a probability that second content will be accessed via the reader application;

storing color depth information corresponding to the second content in a content buffer associated with the reader application;

detecting, by the at least one computer processor, an event corresponding to a first change to a metric indicative of at least one of a state of the device or use of the device;

determining, by the at least one computer processor and based at least in part on the event, pixel values associated with a second portion of the second content;

determining, by the at least one computer processor and based at least in part on the pixel values associated with the second portion, an updated second portion of the second content, the updated second portion including adjusted color values of the respective pixel values to represent the first change;

receiving, by the at least one computer processor, input data that corresponds to a selection associated with the second content; and causing, by the at least one computer processor, the second content to be displayed on the display of the device using the color depth information.

6. The method of claim 5, wherein the metric is a time value, a signal strength of a wireless connection, an amount of available battery power, or a content consumption metric.

7. The method of claim 5, wherein the first content corresponds to a first application executable on the device and the second content corresponds to a second application executable on the device.

8. The method of claim 7, further comprising determining, by the at least one computer processor and based at least in part on the input data, that the selection has caused the first application to transition to a background state and the second application to transition to a foreground state.

9. The method of claim 7, wherein the content buffer is a first content buffer, the method further comprising:

determining, by the at least one computer processor, whether a first probability of the first content being accessed after the second content is greater than a threshold value; and retaining, by the at least one computer processor, the first content in a second content buffer when the first probability of being accessed is above the threshold value or replacing, by the at least one computer processor, the first content with third content having a second probability of being accessed after the second content that is greater than the first probability.

10. The method of claim 5, wherein the color depth information is first color depth information, and wherein the second content has a probability of being accessed after the first content, the method further comprising:

determining, by the at least one computer processor, and based at least in part on the first content and the device usage data, third content having a second probability of being accessed after the first content, wherein the probability is greater than the second probability; and storing second color depth information corresponding to the third content in a second content buffer.

11. The method of claim 10, further comprising:

determining, by the at least one computer processor, and based at least in part on updated device usage data, fourth content having a third probability of being accessed after the first content, wherein the third probability is greater than the second probability; and replacing, by the at least one computer processor, the second color depth information corresponding to the third content with third color depth information corresponding to the fourth content in the second content buffer.

12. The method of claim 10, further comprising:

determining, by the at least one computer processor, that an amount of available data storage has decreased; and deleting, by the at least one computer processor, the first color depth information stored in the second content buffer.

13. The method of claim 5, further comprising:

detecting, by the at least one computer processor, a user-initiated or a system-initiated action; and causing, by the at least one computer processor, the first content to be displayed on the display of the device responsive to the user-initiated or system-initiated action.

14. The method of claim 5, wherein the content buffer is a system-layer buffer.

15. The method of claim 5, wherein the color depth information is first color depth information, and wherein the content buffer is a first content buffer, the method further comprising:
- determining, by the at least one computer processor, and based at least in part on the second content and the device usage data, third content having a highest probability of being accessed after the second content; and
- storing second color depth information corresponding to the third content in a second content buffer.

16. A device, comprising:
- a display comprising a plurality of pixels;
- at least one memory storing computer-executable instructions; and
- at least one processor communicatively coupled to the at least one memory and the display and configured to access the at least one memory and execute the computer-executable instructions to:
  - determine a set of candidate actions capable of being performed subsequent to display of first content on the display, wherein the first content is a first portion of electronic book content accessed via a reader application of the device;
  - identify a candidate action of the set of candidate actions having a highest probability of being performed;
  - determine second content corresponding to the candidate action;
  - store color depth information corresponding to the second content in a content buffer associated with the reader application;
  - detect an event corresponding to a first change to a metric indicative of a state of the device or use of the device;
  - determine, based at least in part on the event, pixel values associated with a second portion of the second content;
  - determine, based at least in part on the pixel values associated with the second portion, an updated second portion of the second content, the updated second portion including adjusted color values of respective pixel values to represent the first change;
  - detect input data indicating a selection associated with the second content; and
  - cause the second content to be displayed on the display of the device using the color depth information.

17. The device of claim 16, wherein the at least one processor is further configured to access the computer-executable instructions to:
- determine, from device usage data, a second candidate action having a next highest probability of being performed;
- determine third content corresponding to the second candidate action; and
- store second color depth information corresponding to the third content in a second content buffer.

18. The device of claim 17, wherein the device usage data further comprises data indicating historical user interactions with one or more other devices.

* * * * *